Nov. 27, 1956  A. NIELSEN  2,771,769
CLAMPING DEVICE FOR FUEL PUMP TESTER
Filed Feb. 8, 1954  2 Sheets-Sheet 1

INVENTOR.
AXEL NIELSEN
BY George R. Ericson
ATTORNEY

Nov. 27, 1956 A. NIELSEN 2,771,769
CLAMPING DEVICE FOR FUEL PUMP TESTER
Filed Feb. 8, 1954 2 Sheets-Sheet 2
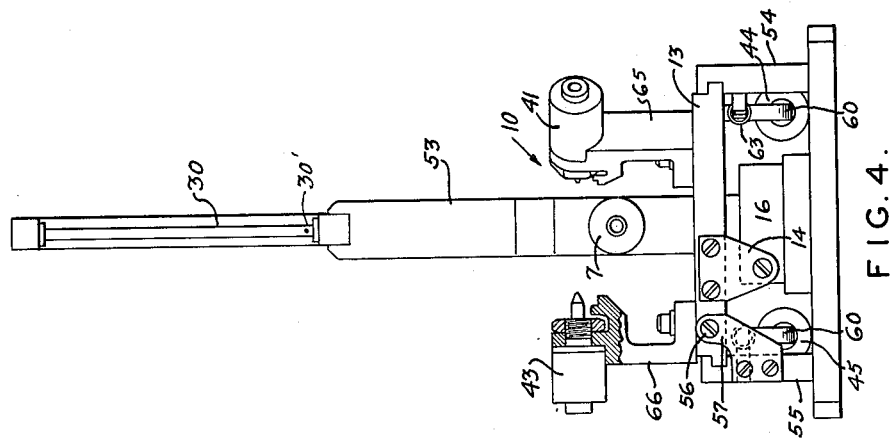
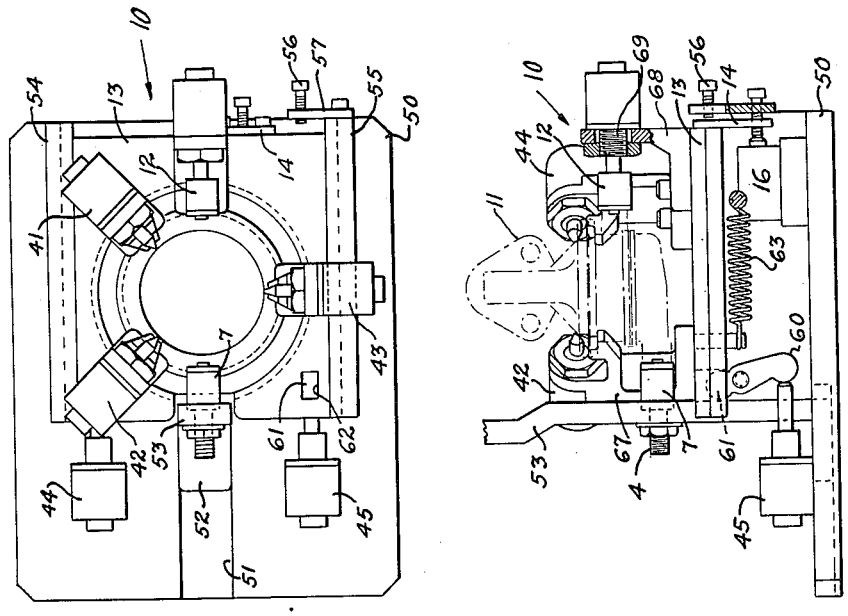
INVENTOR.
AXEL NIELSEN
BY George R. Ericson
ATTORNEY

¹

United States Patent Office 2,771,769
Patented Nov. 27, 1956

2,771,769

CLAMPING DEVICE FOR FUEL PUMP TESTER

Axel Nielsen, St. Louis, Mo., assignor, by mesne assignments, to ACF Industries, Incorporated, New York, N. Y., a corporation of New Jersey Application February 8, 1954, Serial No. 408,683

3 Claims. (Cl. 73—40)

This invention relates to equipment for testing the fluid tightness of manufactured products. More specifically, the invention is in a mechanism suitable for installation in a fuel pump assembly line. The mechanism includes indicating means and means to apply fluid pressures through the indicating means so as to test pump diaphragms and gaskets, and to indicate their acceptance or rejection to an operator.

The apparatus contains a fixture for receiving and holding a fuel pump. On this fixture are devices for sealing the outlet of the pump and connecting the inlet with an apparatus for applying fluid pressure. This apparatus is automatically responsive to the actuation of the fixture for holding the pump. It contains electrically operated valves so connecting the apparatus with a pressure supply as to provide for charging the pump at a given pressure and then for indicating any leakage from within the pump.

The drawings accompanying this description illustrate one example of an apparatus suitable to carry out the objects of this invention.

Fig. 2 is a plan view of a fixture for holding and connecting the pump in the testing apparatus.

Fig. 3 is a side elevation of this fixture showing a fuel pump illustrated in phantom lines clamped in position.

Fig. 4 is a front elevation of the fixture.

Figure 1:
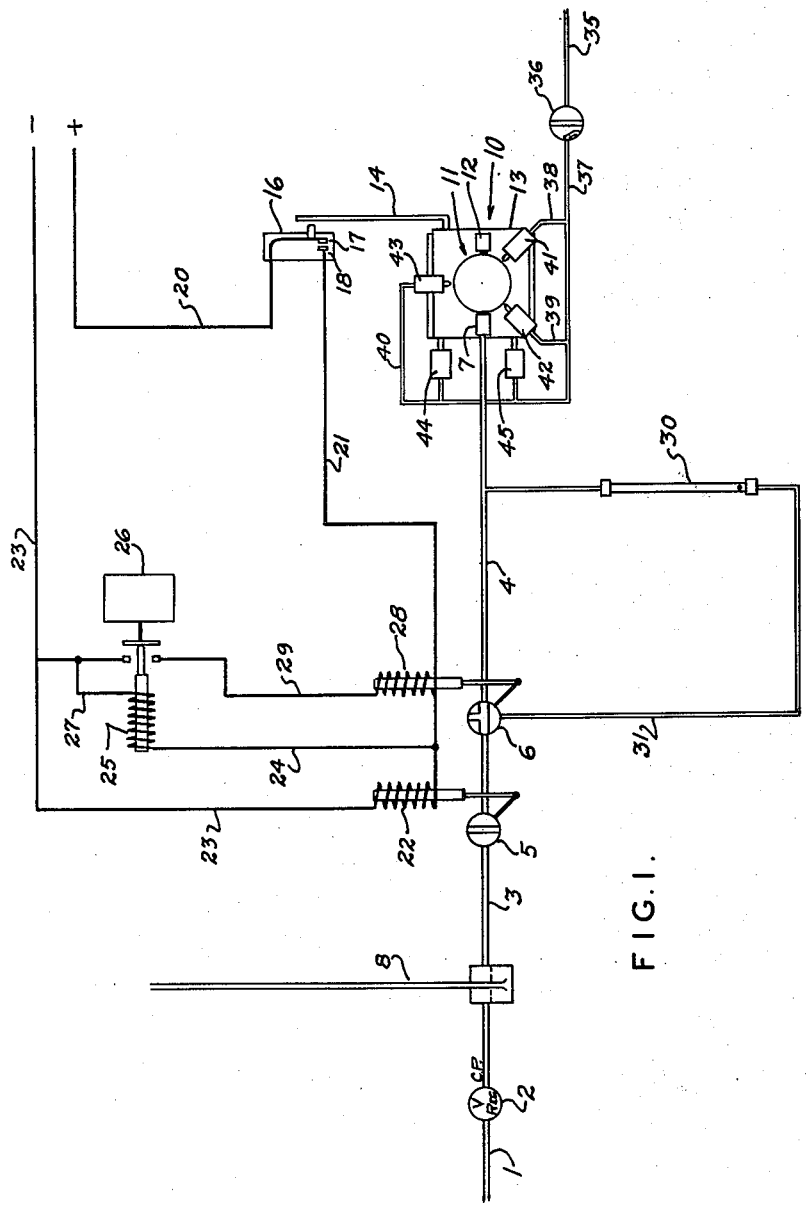
Fig. 1 is a diagrammatic illustration of that apparatus.

Referring, first, to Fig. 1, an air line 1 from a pressure source is connected to a pressure regulating valve 2, which delivers air at a desired pressure through a line 3 extending to and through a manometer tube 8. A continuation of the pressure line 3, indicated as 4, extends to a coupling 7 fixedly mounted on the fixture 10. A pump 11 is diagrammatically shown held fast in the fixture, with its inlet clamped in sealing relation with the coupling 7 and the plug 12. The latter is mounted upon a movable platform 13 of the fixture 10, which also carries the clamping elements engaging the pump body 11, all as will be subsequently described.

In the line 4 are a pair of valves 5 and 6 which are solenoid controlled by windings 22 and 28, respectively. Valve 5 is merely a stopcock type of valve which, on actuation, opens and closes the communication between the line 3 and the line 4. Valve 6 is a three-way valve which, in one position, controls the flow directly through the pressure line 4, and, in the other position, connects the pressure source in the line 4 with a by-pass 31 containing a flow meter 30. Almost any type of flow meter would be suitable, but that contemplated here is one of a type in which a small, light ball is retained in a tapered glass tube, and the flow through the by-pass 31 affects the vertical position of the ball within the flow meter.

Also mounted on the movable platform or carriage 13 of the fixture 10 is a finger 14 overlying a push-button type of switch 16 which is connected in the circuit between the power supply lead 20 and lead 21. One of the terminals 17 of switch 16 is connected with the lead 20 while the other, 18, is connected with lead 21. Movement of the platform 13 of the fixture 10 can thus close the electric circuit between the leads 20 and 21 to energize the solenoids 22 and 28 of the valves 5 and 6 in a sequential manner, as below described. A lead 23, also connected with solenoid 22, provides suitable ground to complete the circuit to the switch 16 from source of power to ground.

Connected with the line 21 is a second lead 24 leading to a solenoid 25 of a time-delay relay 26. A ground connection 27 is provided for the solenoid 25, and relay 26 controls solenoid 28 by opening and closing the circuit between leads 29 and 23.

With the system so far described, the air pressure can be controlled by the solenoid-operated valve 5 so as to supply fluid pressure directly to coupling 7 or by way of the by-pass 31 and flow meter 30. These alternative flow paths are controlled by solenoid-operated valve 6 shown in a position to connect the line 3 directly with the coupling 7. Rotation of the valve 6 by the solenoid 28, however, can connect the coupling 7 with the supply line 3 through the by-pass line 31 and flow meter 30. When the valve 6 is so positioned, direct supply of the air pressure from line 3 to the coupling 7 is cut off, and all of the air will flow from valve 5 to by-pass 31 and flow meter 30.

The system above described is so connected electrically as to control the valves 5 and 6 sequentially. Thus, when the switch 16 is closed by movement of the platform 13 of fixture 10, the circuit between lines 20 and 21 is completed, which will immediately energize solenoid 22 to operate valve 5 to an open position and supply air directly from the line 3 to the coupling 7. At the same time, the solenoid 25 of the time-delay relay 26 will also be energized, but, due to the action of the time-delay relay 26, the valve 6 will remain open so that the air may flow directly through the line 3 to the coupling 7 and charge the pump chamber to a pressure equal to the pressure in line 3. After a suitable delay, relay 26 will close, energizing solenoid 28 so as to connect the line 3 to coupling 7 through valve 6, the by-pass 31, and the flow meter 30. Direct supply of air from the line 3 to the coupling 7 is cut off. Since the coupling 7 is now supplied with pressure through the by-pass 31 and flow meter 30, any leakage in the pump 11 will be indicated by a corresponding amount of flow in the flow meter 30. This will indicate to the operator that the pump diaphragm, gasket, or valves are unsuitable and not up to standard, so that the pump may be rejected. On the other hand, if no leakage is shown on the flow meter 30, the pump is acceptable.

Turning now to the fixture 10 for clamping the pump 11 in position, this device is air operated from an independent fluid pressure source through a line 35 controlled by valve 36. In one position valve 36 connects line 37 with the line 35. In another position valve 36 cuts off the pressure from line 35 to line 37 and connects line 37 with atmosphere to exhaust the pressure from line 37. Pressure line 37 is, in turn, provided with a plurality of branches 38, 39 and 40. Each of these branches connect with air-operated clamping elements 41, 42, and 43 which hold the pump to be tested on the platform or carriage 13.. Branch line 40 has a pair of branches connected to air cylinders 44 and 45 which are, in turn, connected directly with the movable platform or carriage 13 of the fixture 10. Operation of the valve 36 to connect the line 37 with pressure in the line 35 will supply air pressure, in turn, to each of the clamping elements 41, 42, and 43 of the workholder to force them into firm engagement with the pump 11 and hold the pump against the plug 12. Pressure in line 40 will eventually build up sufficiently to operate the cylinders 44 and 45 to move the platform or carriage 13 of the fixture 10. As the carriage moves to the left, the pump inlet engages the coupling 7, and the air pressure in cylinders 44 and 45 clamps the pump laterally between the plug 12 and the coupling 7 to seal the inlet and outlet of the pump.

Turning now to Figs. 2, 3 and 4, a base 50 is slotted as at 51 to receive a bracket 52 having an extension 53 for supporting the flow meter 30 and the coupling 7. Both the coupling and the flow meter are supported in fixed relation to the base 50 by means not shown. The base 50 has a pair of upstanding, slotted guideplates 54 and 55, as shown in Figs. 2 and 4, and these provide a guideway for the movable platform or carriage 13 of the fixture 10. The movable platform or carriage 13 is supported in sliding relation with the guideplates 54 and 55, and its motion in one direction is limited by a stop 56 adjustably mounted in a bracket 57. Base 50 also supports the air-actuating cylinders 44 and 45 which have plungers engaging pivoted links 60. Fig. 3 shows the fixture 10 with guide 55 removed so that one of the cylinders 45 with its link 60 is revealed. Pivoted links 60, in turn, have cam-shaped ends 61 engaging in a suitable socket in the movable platform or carriage 13. The socket is clearly shown in Fig. 2, and is shown in dotted lines as 62 in Fig. 3. A pair of springs 63 engage a finger supported on the movable platform or carriage 13, and are connected at the other end to a fixed pin projecting from the guideplates 54 and 55 on the base 50. The action of springs 63 tends to maintain the movable platform or carriage 13 in engagement with the fixed stop 56 at one end of the travel of the platform or carriage 13. Air cylinders 44 and 45 act through links 60 to move the platform or carriage 13 away from the stop 56.

The movable platform or carriage 13 of the fixture 10 is provided with three upstanding brackets 65, 66 and 67, as shown in Figs. 3 and 4. These brackets support the clamping elements 41, 42 and 43, respectively of the workholder. Also supported on the movable platform or carriage 13 is a bracket 68, which, in turn, mounts the plug 12 on the adjusting means 69 shown in Fig. 3.

From this description it will be readily understood that the clamping elements 41, 42 and 43, together with the plug 12, are all mounted upon the movable platform or carriage 13, whereas the coupling 7 is fixed with relation to the base 50. In operation, pump 11 is placed within the clamping elements 41, 42 and 43, and the valve 36 turned to connect pressure to each of the lines 38, 39 and 40. This will move the clamping elements 41, 42 and 43 into clamping relation with the pump 11. As the pressure builds up within the clamping elements, the pump will be securely held in position by the workholder on the platform or carriage 13. When the pressure reaches a predetermined point, actuating cylinders 44 and 45 will then overcome the resistance of springs 63 and move the platform or carriage 13. Plug 12, which is mounted on the platform or carriage 13, will be forced against the outlet of the pump 11 and move the pump bodily along with the clamping elements into engagement with the coupling 7, so that the pump inlet is sealed with the coupling 7. As the platform or carriage 13 moves to provide the sealing action of the inlet and the outlet of the pump 11, finger 14 will actuate the switch 16. When switch 16 is closed, the electric circuit will be energized first to charge the pump 11 with air. This is done by the opening of the valve 5 connecting the coupling 7 directly with the pressure line 3. A suitable interval of time will elapse sufficient to charge the pump 11 with high pressure air, and then the relay 26 will operate to close the circuit to the solenoid 28 and open the by-pass through line 31 to the flow meter 30. Inspection of the flow meter 30 will indicate to the operator from the position of the little ball 30' shown in Fig. 4 whether or not there is leakage in the pump 11. When this indication has been made, the operator then returns the valve 36 to the position shown in Fig. 1, which will connect the line 37 with atmosphere, and the pressure will exhaust from the line 37 and its connections, thereby releasing the clamping elements of the workholder and allowing the platform or carriage 13 to return to engagement with the stop 56 by action of the springs 63. The pump 11 will thereby be released, switch 16 will open, and the operator may replace the pump with the next one to be tested, since valve 5 will be closed to stop the flow to the coupling 7.

A structure has been described which will carry out all the objects of the invention. It is contemplated, however, that other embodiments of the invention will be obvious to those skilled in the art.

I claim:

1. Testing equipment comprising, in combination, a pneumatic system including a charging circuit, and a by-pass in said circuit having a flow indicator, a fixture for holding the device tested including a base for said fixture, a coupling on said base connected to said pneumatic system, a carriage slidable on said base for movement towards said coupling, power means for moving said carriage, control means for said power means connected to a source of power to operate said carriage, means to energize said charging circuit and said by-pass sequentially, and means responsive to operation of said carriage by said power means to control the means to energize said pneumatic system.

2. A pressure testing apparatus for a fuel pump comprising in combination, a source of fluid under pressure, a leakage detecting system supplied from said source for connection with the pump to be tested, including a charging circuit, a by-pass for said circuit, a flow meter in said by-pass, means for sequentially connecting first said charging circuit and then said by-pass with said source, a fixture for supporting the pump to be tested, a coupling in said detecting system adapted for connection with the pump inlet located on one side of said fixture, a plug for sealing the pump outlet located on another side of said fixture, means for causing relative movement between said coupling and said plug in a direction to decrease the distance between said plug and coupling so as to clamp the pump against lateral displacement on said fixture and seal the pump inlet and outlet, and means responsive to said clamping operation to initiate the sequential operation of said charging circuit by said connecting means to charge the pump with fluid under pressure and then operate said by-pass circuit to detect leakage.

3. A pressure testing apparatus for a fuel pump comprising in combination, a source of fluid under pressure, a leakage detecting system supplied from said source for connection with the pump to be tested including a charging circuit, a by-pass for said circuit, a flow meter in said by-pass, and means for sequentially connecting first said charging circuit and then said by-pass with said source, a fixture for supporting the pump to be tested, means for clamping the pump down on said fixture against vertical displacement, a coupling in said detecting system adapted for connection with the pump inlet located on one side of said fixture, a plug for sealing the pump outlet located on another side of said fixture, means causing relative movement between said coupling and plug in a direction to decrease the distance between said plug and coupling so as to clamp the pump against lateral displacement on said fixture and seal the pump inlet and outlet, and means responsive to the completion of said clamping operations to initiate sequential operation of said charging circuit by said connecting means to charge the pump with fluid under pressure and then operate said by-pass circuit to detect leakage.

(References on following page)

References Cited in the file of this patent

UNITED STATES PATENTS

| | | |
|---|---|---|
| 1,378,215 | Burns | May 17, 1921 |
| 1,554,637 | McKee | Sept. 22, 1925 |
| 2,098,677 | Saballus et al. | Nov. 9, 1937 |
| 2,459,535 | Kopischiansky | Jan. 18, 1949 |
| 2,565,086 | Peterson | Aug. 21, 1951 |
| 2,566,742 | ODell | Sept. 4, 1951 |
| 2,671,345 | Rubin | Mar. 9, 1954 |
| 2,673,462 | Thompson | Mar. 30, 1954 |